(12) United States Patent
Maitra et al.

(10) Patent No.: US 9,495,491 B2
(45) Date of Patent: Nov. 15, 2016

(54) RELIABILITY AWARE THERMAL DESIGN

(71) Applicant: MICROSOFT TECHNOLOGY LICENSING, LLC, Redmond, WA (US)

(72) Inventors: Kingsuk Maitra, San Jose, CA (US); Tung Thanh Nguyen, San Jose, CA (US); Brian Keith Langendorf, Benicia, CA (US); Julia Purtell, Menlo Park, CA (US); Rune Hartung Jensen, Cupertino, CA (US); Ranjit Gannamani, San Jose, CA (US); Amit Prabhakar Marathe, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 72 days.

(21) Appl. No.: 14/318,221

(22) Filed: Jun. 27, 2014

(65) Prior Publication Data

US 2015/0261901 A1 Sep. 17, 2015

Related U.S. Application Data

(60) Provisional application No. 61/953,346, filed on Mar. 14, 2014.

(51) Int. Cl.
*G06F 17/50* (2006.01)
(52) U.S. Cl.
CPC ....... *G06F 17/5022* (2013.01); *G06F 17/5009* (2013.01); *G06F 17/5081* (2013.01)
(58) Field of Classification Search
CPC ........... G06F 17/5022; G06F 17/5009; G06F 17/5081

USPC ........................................................ 716/132
See application file for complete search history.

(56) References Cited

U.S. PATENT DOCUMENTS 6,389,582 B1 * 5/2002 Valainis .............. G06F 17/5072
165/185
7,050,959 B1 5/2006 Pollard, II et al.
(Continued)

FOREIGN PATENT DOCUMENTS

WO 2008103927 A2 8/2008

OTHER PUBLICATIONS

Karl, et al., "Reliability Modeling and Management in Dynamic Microprocessor-Based Systems", In Proceedings of 43rd Design Automation Conference, Jul. 24, 2006, pp. 1057-1060.
(Continued)

*Primary Examiner* — Jack Chiang
*Assistant Examiner* — Brandon Bowers
(74) *Attorney, Agent, or Firm* — Brandon Roper; Judy Yee; Micky Minhas

(57) ABSTRACT

Embodiments are disclosed that relate to implementing semiconductor device cooling systems that leverage awareness of regional voltage and temperature reliability risk considerations. For example, one disclosed embodiment provides a method of implementing a cooling system configured to cool an integrated circuit. The method involves first determining a heat dissipation factor that would reduce each region of the integrated circuit to a reduced temperature in order to maintain an overall failure rate. An analysis is then performed, using an insight about the relative reliability risk of elevated voltage and temperatures, to identify a region of the integrated circuit whose temperature can be permitted to rise without exceeding the overall failure rate, thereby permitting implementation of a cooling system with a reduced heat dissipation factor.

20 Claims, 7 Drawing Sheets

(56) References Cited

U.S. PATENT DOCUMENTS

| | | | | |
|---|---|---|---|---|
| 7,191,113 | B2* | 3/2007 | Acar | G06F 17/5036 702/59 |
| 7,383,520 | B2* | 6/2008 | Chandra | G06F 17/50 716/111 |
| 7,454,316 | B2 | 11/2008 | Bose et al. | |
| 7,472,038 | B2 | 12/2008 | Bose et al. | |
| 7,480,874 | B2* | 1/2009 | Banoo | G06F 17/5036 716/112 |
| 7,882,394 | B2* | 2/2011 | Hosek | G05B 23/0235 702/184 |
| 8,019,580 | B1* | 9/2011 | Chandra | G06F 17/5022 703/13 |
| 2004/0054979 | A1 | 3/2004 | Bobba et al. | |
| 2013/0298101 | A1* | 11/2013 | Chandra | G06F 17/50 716/136 |

OTHER PUBLICATIONS

Zhuo, et al., "Process Variation and Temperature-Aware Reliability Management", In Proceedings of the Conference on Design, Automation and Test in Europe, Mar. 8, 2010, 6 pages.

Rosing, et al., "Power and Reliability Management of SoCs", In IEEE Transactions on Very Large Scale Integration, vol. 15, No. 4, Apr. 2007, 13 pages.

Ramachandran, et al., "Metrics for Lifetime Reliability", In UIUC CS Technical Report UIUCDCS-R-2006-2762, Aug. 2006, 24 pages.

Coskun, et al., "Analysis and Optimization of MPSoC Reliability", In Journal of Low Power Electronics, vol. 2, No. 1, Apr. 2006, pp. 56-69.

Vaddina, et al., "Thermal Modelling of 3D Multicore Systems in a Flip-Chip Package", In IEEE International SOC Conference, Sep. 27, 2010, 5 pages.

Mihic, et al., "Reliability and Power Management of Integrated Systems", In Proceedings of the EUROMICRO Systems on Digital System Design, Aug. 31, 2004, 7 pages.

Srinivasan, et al., "The Case for Lifetime Reliability-Aware Microprocessors", In Proceedings of the 31st Annual International Symposium on Computer Architecture, Jun. 19, 2004, 12 pages.

Kitchin, John, "Statistical Electromigration Budgeting for Reliable Design and Verification in a 300 MHz Microprocessor", In Digest of Technical Papers Symposium on VLSI Circuits, Jun. 8, 1995, pp. 115-116.

Nigam, et al., "Accurate Model for TDDB in High-K/Metal Gate Stacks", In IEEE International Reliability Physics Symposium, Apr. 26, 2009, pp. 523-530.

IPEA European Patent Office, Second Written Opinion issued in Application No. PCT/US2015/019812, Mar. 21, 2016, WIPO, 8 pages.

Panigrahy, A. et al., "Acoustics Management for Server Debug Validation Platforms", In Proceeding of the 25th Annual IEEE Semiconductor Thermal Measurement and Management Symposium, Mar. 15, 2009, 6 pages.

Cho, S. et al., "Heat Dissipation of Printed Circuit Board by the High Thermal Conductivity of Photo-Imageable Solder Resist", In Electronics Material Letters, vol. 6, Issue 4, Dec. 31, 2010, 6 pages.

Floyd, M. et al., "Introducing the Adaptive Energy Management Features of the Power7 Chip", IEEE Micro, vol. 31, Issue 2, Apr. 2011, 16 pages.

Huang, W. et al., "TAPO : Thermal-Aware Power Optimization Techniques for Servers and Data Centers", In Proceeding of the 2011 International Green Computing Conference and Workshops (IGCC) , Jul. 25, 2011, 8 pages.

Pradelle, B. et al., "Energy-Centric Dynamic Fan Control", In Computer Science—Research and Development, vol. 29, Issue 3, Published online on Jul. 25, 2013, 9 pages.

ISA European Patent Office, International Search Report and Written Opinion issued in Application No. PCT/US2015/019812, Nov. 2, 2015, WIPO, 19 pages.

IPEA European Patent Office, International Preliminary Report on Patentability Issued in PCT Application No. PCT/US2015/019812, Jun. 30, 2016, WIPO, 9 pages.

\* cited by examiner

|  | TEMPERATURE | VOLTAGE | FAILURE RATE |
|---|---|---|---|
| CPU 104 | MODERATE | HIGH | HIGH |
| GPU 106 | HIGH | MODERATE | MODERATE |
| MEMORY 102 | LOW | MODERATE | LOW |
| I/O 108 | LOW | HIGH | LOW |
| MEM CON 110 | MODERATE | MODERATE | LOW |

FIG. 6

RELIABILITY AWARE THERMAL DESIGN

RELATED APPLICATIONS

This application claims priority to U.S. Provisional Application No. 61/953,346, filed Mar. 14, 2014, the entire contents of which is incorporated by reference for all purposes.

BACKGROUND

The constant pursuit of increased performance and smaller form factors is a central fact of modern system-on-chip (SOC) design. Typical performance-increasing approaches include increased integration of functional blocks (GPU, CPU, memory, I/O, etc.) and use of higher supply voltages. These and other approaches to SOC design can lead to higher operating temperatures. To maintain reasonably low failure risk, greater measures must be taken to dissipate heat, typically at added expense, complexity and size (e.g., larger heat sinks). In some cases, heat dissipation can also compromise acoustic performance For instance, a high speed fan can interfere with voice activation functionality. Acoustic performance degradation and other costs associated with thermal solutions are made worse given the widespread tendency to design for worst case operating scenarios.

SUMMARY

This Summary is provided to introduce a selection of concepts in a simplified form that are further described below in the Detailed Description. This Summary is not intended to identify key features or essential features of now- or future-claimed subject matter, nor is it intended to be used to limit the scope of such claimed subject matter. Furthermore, such claimed subject matter is not limited to implementations that solve any or all disadvantages noted in any part of this disclosure.

Embodiments are disclosed that relate to implementing semiconductor device cooling systems that leverage awareness of regional voltage and temperature reliability risk considerations. For example, one disclosed embodiment provides a method of implementing a cooling system configured to cool an integrated circuit, comprising determining, for each of a plurality of regions of the integrated circuit, a failure rate for that region based on a projected temperature and a projected supply voltage of that region, determining a heat dissipation factor of the cooling system based on the failure rates of the regions, where implementation of the heat dissipation factor would, for each region, reduce its projected temperature to a reduced temperature, so that an overall failure rate of the integrated circuit is not exceeded during operation of the integrated circuit, analyzing the reduced temperatures and projected supply voltages of the regions to identify a selected region having a projected supply voltage less than a maximum supply voltage of the regions and for which a temperature increase from the reduced temperature can be permitted without exceeding the overall failure rate, and implementing the cooling system with a reduced heat dissipation factor by configuring the cooling system to allow the temperature increase in the selected region.

BRIEF DESCRIPTION OF THE DRAWINGS

FIG. 6 schematically shows determination of failure rates for each functional block of the system-on-a-chip of FIG. 1 in accordance with an implementation of this disclosure.

DETAILED DESCRIPTION

In a system-on-a-chip (SOC), multiple functional blocks including but not limited to a central processing unit (CPU), graphics processing unit (GPU), memory, and input/output (I/O) subsystems may be integrated in a single package. Increasingly, the integration of larger numbers of functional blocks in an SOC is desired to maximize the functionality afforded by the SOC. Increases in SOC performance are also sought, often realized by increasing the voltage supplied to certain functional blocks (e.g., CPU) of the SOC. Both trends, however, place increasingly higher demands on SOC cooling systems by increasing the amount of heat generated by the SOC that must be dissipated so that the SOC does not exceed an acceptable reliability risk during operation. Without sufficient heat dissipation, a number of failure mechanisms increasingly arise as both SOC integration and supply voltages increase, such as back end of the line (BEOL), front end of the line (FEOL), time-dependent dielectric breakdown (TDDB), and xBTI failures.

To ensure sufficient heat dissipation and intended SOC operation in the presence of increasing integration and supply voltages, the heat-dissipating power of an SOC cooling system may accordingly be increased. Frequently, this heat-dissipating power exceeds what is required for the majority of SOC operating conditions, as the cooling system is designed based on worst-case operating conditions—specifically, the maximum voltage that may be supplied to one or more functional blocks of the SOC and the maximum temperatures that they may respectively assume. Such thermal "over-design" may cause unnecessary increases in the power consumption, material cost, and packaging space of the cooling system, for example. In computing contexts that enable users to supply voice input, thermal over-design may cause active cooling mechanisms (e.g., fans) to exhibit increased acoustic output, adversely affecting interpretation of voice input and degrading the user experience.

Accordingly, implementations are disclosed that relate to implementing semiconductor device cooling systems that leverage awareness of regional voltage and temperature reliability risk considerations. This may afford savings in the design and operation of a cooling device, as heat dissipation requirements may be reduced relative to those determined based on worst-case estimates. Reduction of heat dissipation requirements may be particularly beneficial in a thin form factor computing device (e.g., tablet, smartphone, etc.), as the size of a cooling device may be reduced, allowing a corresponding reduction in the size of a housing enclosing components of the computing device.

Figure 1:
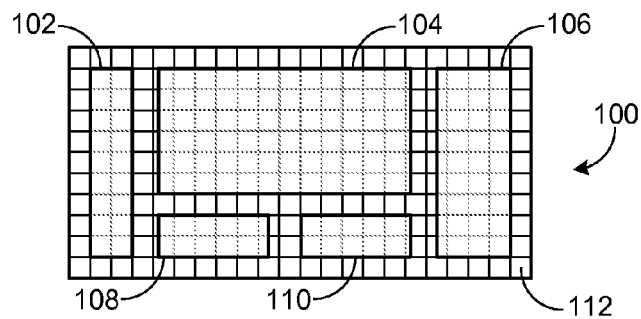
FIG. 1 schematically shows an exemplary system-on-a-chip in accordance with an implementation of this disclosure.

FIG. 1 schematically shows an exemplary SOC 100 in accordance with an implementation of this disclosure. SOC 100 may generally be considered a semiconducting device comprising a plurality of integrated circuits (ICs) implemented in silicon to provide one or more functions of a typical computing device in a single package. In the depicted example, SOC 100 comprises a plurality of functional blocks that each provide unique functionality—specifically, the SOC includes a memory block 102, a CPU block 104, a GPU block 106, an I/O block 108, and a memory controller block 110. It will be appreciated, however, that the number, type, and arrangement of these functional blocks are provided as non-limiting examples, and that SOC 100 may include other components not shown, such as bridge structures.

Figure 2:
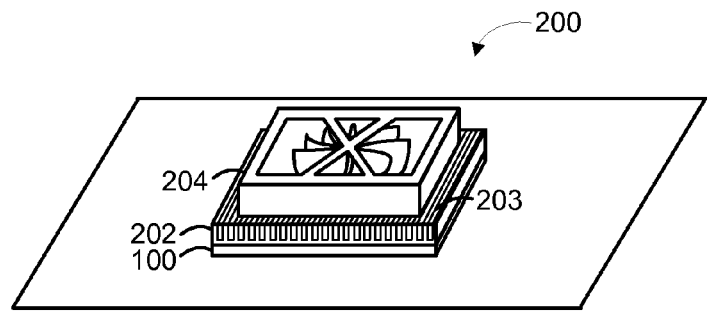
FIG. 2 shows an exemplary cooling system configured to dissipate heat generated by the system-on-a-chip of FIG. 1 in accordance with an implementation of this disclosure.

SOC 100 generates heat when operated. To ensure intended SOC operation, and that a reliability risk does not exceed a predetermined level, heat generated by the SOC may be dissipated by a suitable cooling system. FIG. 2 shows an exemplary cooling system 200 configured to dissipate heat generated by SOC 100. In this example, cooling system 200 includes a passive cooling mechanism shown as a heat sink 202 positioned proximate and above SOC 100. Heat sink 202 may be comprised of a thermally conductive material (e.g., copper, aluminum, metallic alloys, etc.) and may include a plurality of elements (e.g., fins 203) configured to increase the surface area with which heat may be dissipated. Although not shown, a thermal interface material may thermally bond a top surface of SOC 100 to a bottom surface of heat sink 202 to maximize thermal transfer therebetween. Cooling system 200 also includes an active cooling mechanism shown as a fan 204 positioned above heat sink 202 and operable to draw heat away from SOC 100. In some implementations, cooling system 200 may include heat sink 202 and not fan 204, in which case SOC 100 may be referred to as being "passively" cooled. For implementations in which fan 204 is included, SOC 100 may be referred to as being "actively" cooled. Other cooling mechanisms are contemplated, however, including but not limited to active liquid cooling mechanisms.

The level and/or rate at which heat generated by SOC 100 is dissipated by cooling system 200 may be reduced without exceeding an acceptable reliability risk by leveraging insights into SOC operation. Rather than designing a cooling system based on worst-case SOC operation (e.g., designing the cooling system to sufficiently dissipate heat when the functional blocks of the SOC are at a maximum temperature and are receiving a maximum supply voltage), temperatures and voltages representative of typical SOC operation may be considered. In some approaches, a usage model may be used to predict a projected temperature distribution across SOC 100 by simulating thermal output based on SOC activity when executing real-world code. The projected temperature distribution may be combined with projected supply voltages expected to be supplied to the functional blocks to inform the design of cooling system 200 prior to implementation of the cooling system. In some approaches, the projected temperature distribution and supply voltages may be updated during SOC operation to drive dynamic modification of SOC and/or cooling system operation.

FIG. 1 also shows how SOC 100 may be conceptually partitioned into a plurality of regions (e.g., region 112) to better inform the design and/or operation of cooling system 200. In this approach, the area of SOC 100 and its functional blocks may be spatially divided into regions such that each region may have an associated temperature and voltage (and/or other operating parameters). In this way, spatial variation in the temperature and voltage of a given functional block may be accounted for, rather than assuming a single temperature and voltage for the functional block. As described in further detail below, this partitioning may be performed on an iterative basis to obtain increasingly granular insight into SOC operation. It will be appreciated that SOC 100 may be partitioned into any suitable region numbers and geometries.

Figures 3A, 3B:
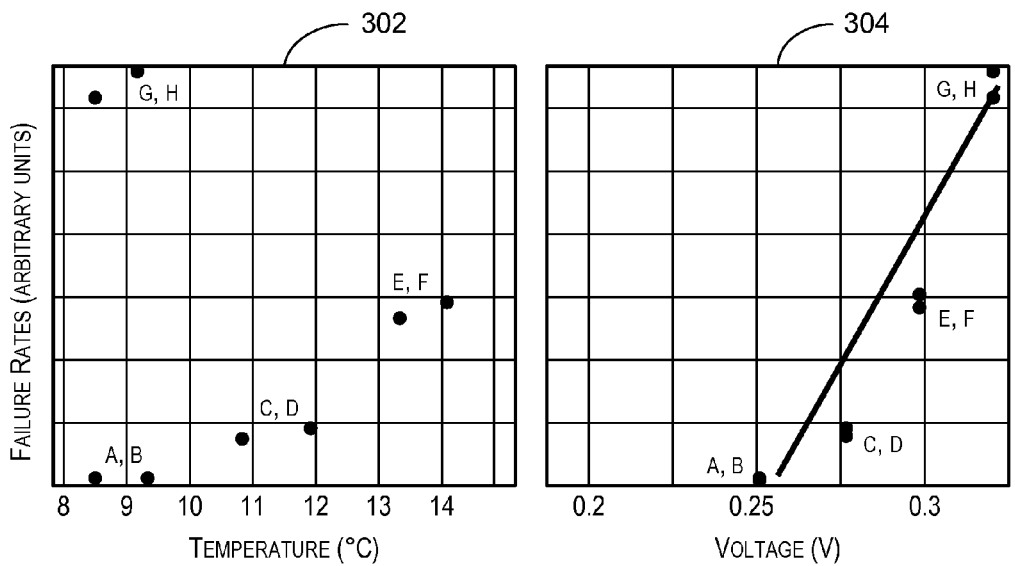
FIGS. 3A-B depict exemplary datasets showing device failure rates as a function of temperature and voltage, respectively, in accordance with an implementation of this disclosure.

The design and/or operation of cooling system 200 may also leverage insights into the asymmetrical contribution of temperature and voltage to SOC failure rates. FIGS. 3A and 3B depict exemplary datasets 302 and 304 showing device failure rates as a function of temperature and voltage, respectively. Datasets 302 and 304 are particularly representative of the failure rates of SOC 100. Successive pairs of data points ({A, B}, {C, D}, {E, F}, {G, H}) were collected at the same voltages but at different temperatures. While a positive correlation between failure rate and temperature is shown in FIG. 3A, a significantly greater positive correlation between failure rate and voltage is shown in FIG. 3B. Data points G and H particularly exhibit the highest failure rates by a significant margin; while associated with relatively low temperatures, they were associated with the highest voltage of any data point. Accordingly, cooling system design and/or operation may account for the higher contribution to failure rate by voltage than temperature. As described in further detail below, voltage may be weighted higher than temperature when computing failure rates, allowing the temperature of some functional blocks and/or regions of SOC 100 to increase without requiring a corresponding increase in heat dissipation to meet an acceptable failure rate.

Figure 4A:
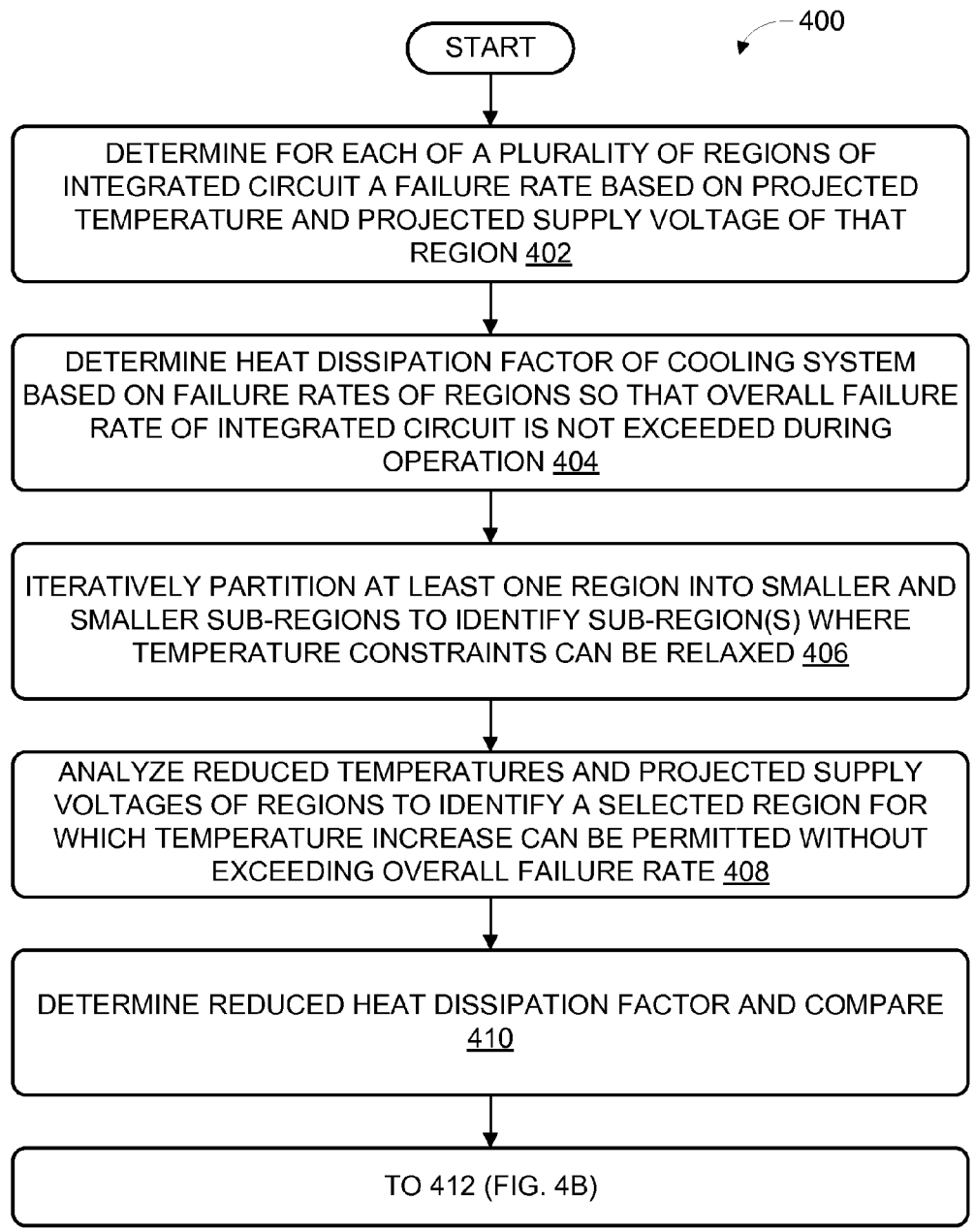
FIGS. 4A-C show a flowchart illustrating a method of implementing a cooling system in accordance with an implementation of this disclosure.
Figure 4B:
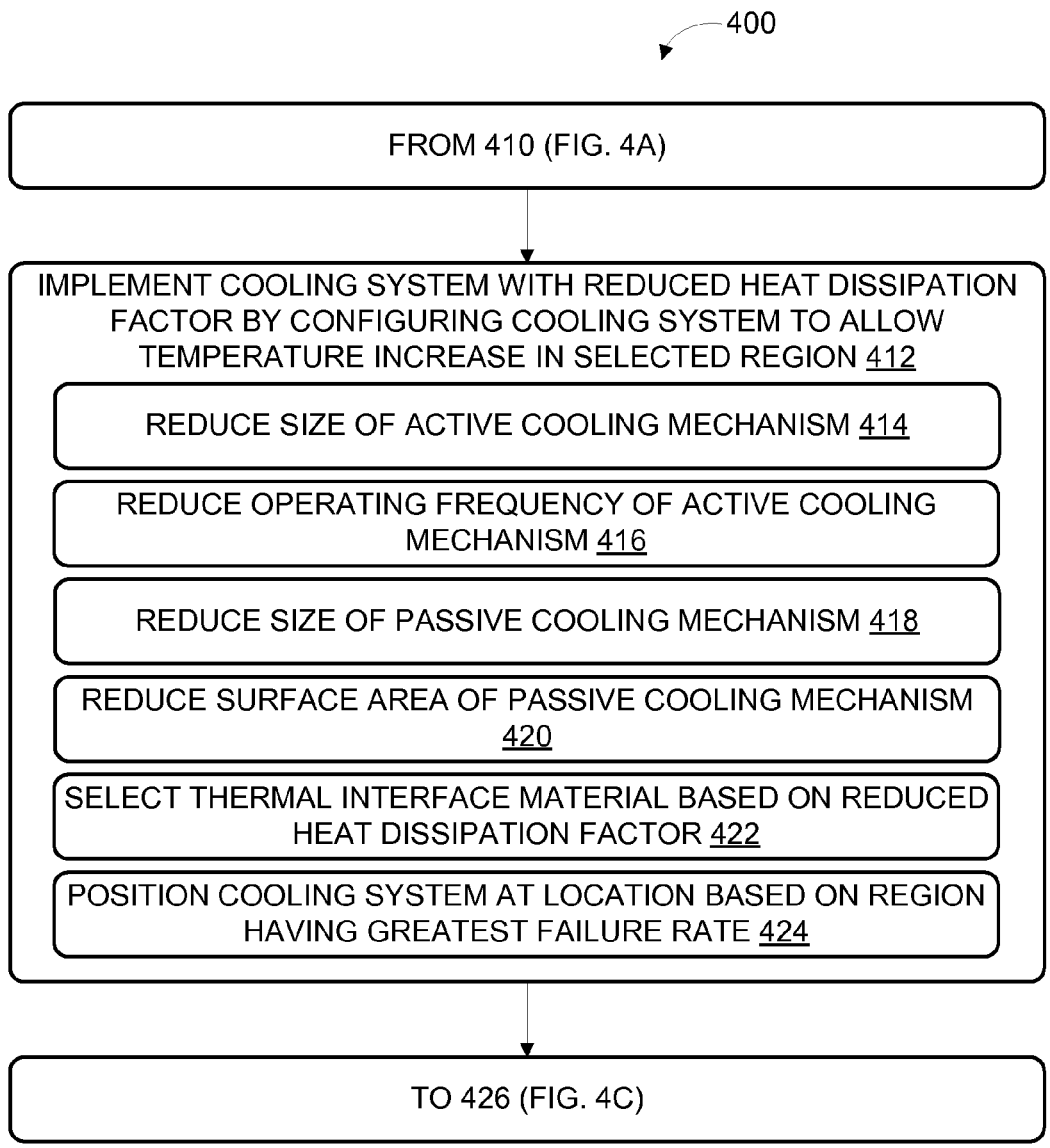
Figure 4C:
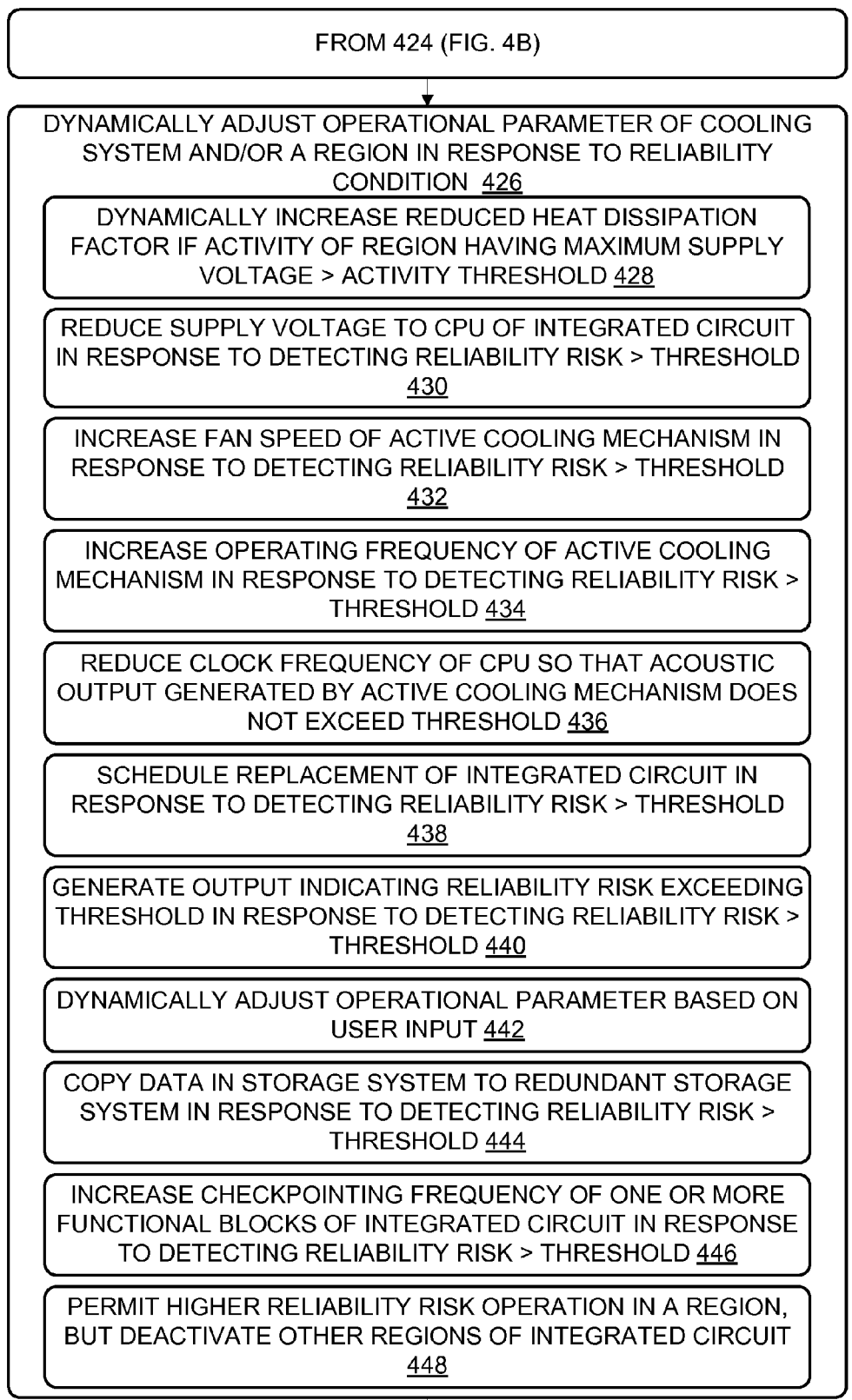
Figure 7:
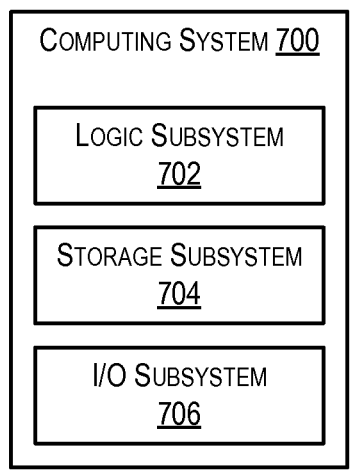
FIG. 7 schematically shows a non-limiting example of a computing system in accordance with an implementation of this disclosure.

FIGS. 4A, 4B, and 4C show a flowchart illustrating a method 400 of implementing a cooling system in accordance with this disclosure. Method 400 may be used to implement cooling system 200 for SOC 100, for example. Moreover, aspects of method 400, particularly those associated with dynamic active cooling policies, may be stored as machine-readable instructions in a suitable storage subsystem and executed by a suitable logic subsystem. FIG. 7 shows examples of suitable storage and logic subsystems.

At 402 of method 400, a failure rate for each of a plurality of regions of an integrated circuit (IC) is determined based on a projected temperature and a projected supply voltage of that region. In some examples, the IC may be a collection of functional blocks or a SOC such as SOC 100 (FIG. 1), for example. Determining a failure rate of each of the plurality of regions may first include determining a temperature distribution across the IC, for example based on power consumed for a given usage model.

Figure 5:
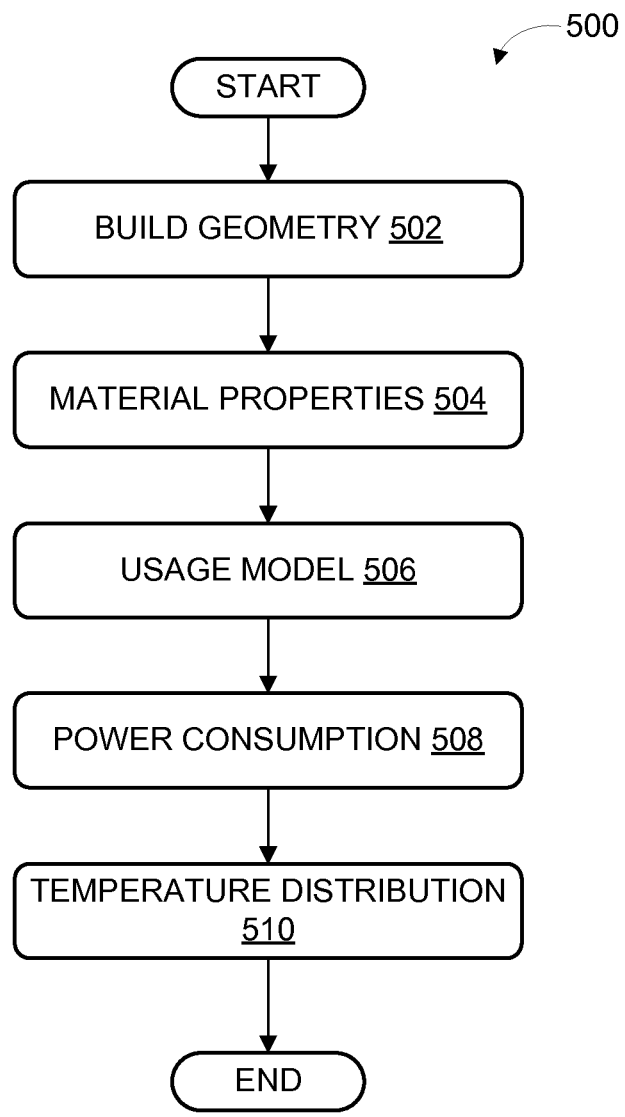
FIG. 5 shows a flowchart illustrating a method of determining a temperature distribution across an integrated circuit in accordance with an implementation of this disclosure.

Turning to FIG. 5, a flowchart illustrating a method 500 of determining a temperature distribution across an IC is shown. Method 500 may be used to determine a temperature distribution across SOC 100 (FIG. 1), for example. Method 500 includes accounting for, at 502, the geometry of the IC (e.g., dimensions of the IC, size and distribution of functional blocks, etc.), and, at 504, the material properties of the IC (e.g., transistor types and material composition). At 506, a usage model may be utilized, which, as described above, may provide a characterization of the activity of the functional blocks during operation. At 508, the projected power consumption of the IC may be determined based on the usage model utilized at 506, and at 510, a temperature distribution across the IC may be determined based on the projected power consumption determined at 508. Determination of the temperature distribution may include utilization of known computational fluid dynamics techniques, for example. The temperature distribution may include projected temperatures associated with each region of the IC.

Using projected voltages and the determined temperature distribution, a failure rate for each region of the IC may be determined FIG. 6 schematically shows determination of failure rates for each functional block of SOC 100 (FIG. 1), where a projected temperature and a projected supply voltage are associated with each functional block. A failure rate is determined for each functional block based on the projected temperature and the projected voltage of that block, while taking into account the asymmetrical contribution of voltage and temperature to failure rate described above with reference to FIG. 3. This asymmetry can be particularly seen by comparing computation of the failure rates of the CPU functional block 104 and the GPU functional block 106. While the projected temperature associated with CPU functional block 104 is considered moderate, its projected supply voltage is considered high. Under these conditions, the determined failure rate of CPU functional block 104 is high. Conversely, while the projected temperature of GPU functional block 106 is high, its projected supply voltage is moderate, leading to a failure rate at a moderate level. Determination of the failure rates for the other functional blocks also reflect this asymmetry. Further, while described in terms of functional blocks, it will be appreciated that failure rates for each of a plurality of regions into which SOC 100 is partitioned may be determined For example, reliability may be assessed for sub-regions of CPU functional block 104.

Following determination of failure rates for each of the functional blocks, an overall failure rate of the IC may be determined based on the individual functional block failure rates. Determination of the overall failure rate may include weighting of one or more of the individual failure rates such that some functional blocks (or regions) contribute to the overall failure rate more than others. In some implementations, a sum-of-failure rate (SOFR) methodology may be used to assess the overall failure rate of the IC.

Returning to FIG. 4A, at 404 of method 400, a heat dissipation factor of the cooling system is determined based on the failure rates of the regions so that the overall failure rate of the IC is not exceeded during operation of the IC. In particular, implementation of the heat dissipation factor (e.g., operating the cooling system at the heat dissipation factor) would, for each region, reduce its projected temperature to a reduced temperature so that the overall failure rate is not exceeded during IC operation.

The heat dissipation factor may be an arbitrary unit-less number, a thermal transfer coefficient, and/or other designation that characterizes the thermal dissipation performance of the cooling system. The heat dissipation factor for a given thermal design is a function of various aspects of the cooling system, e.g., the heat sink size; number and size of heat sink fins or other features affecting surface area; heat sink materials; materials and design of the thermal interface between the IC and the heat sink; size of the cooling fan; etc. The heat dissipation factor can also dynamically change during operation, for example by varying fan speed or otherwise changing the operation of the cooling fan. Both passive and active cooling mechanisms can affect the heat dissipation factor.

Next, at 406 of method 400, at least one region of the IC is iteratively partitioned into smaller and smaller sub-regions to identify sub-regions where temperature constraints can be relaxed. This is an increasingly granular analysis of the voltage and temperature conditions on the IC, and it leverages the insight that increased voltage typically has a greater effect on reliability than temperature increases. The iterative partitioning at 406 includes considering the supply voltages and determined temperature distribution in the sub-region. The overall failure rate and heat dissipation factor at 404 are predicated on an assumption that temperature must be reduced to a certain level. The granular partitioning at 406 allows identification of one or more sub-regions where temperatures can be allowed to float higher without compromising the required overall failure rate. Iterative partitioning in this manner allows a more granular assessment of SOC operation, allowing the cooling system to be tailored to actual operating conditions and not worst-case assumptions.

At 408 of method 400, the reduced temperatures and projected supply voltages of the regions are analyzed to identify a selected region for which a temperature increase can be permitted without exceeding the overall failure rate. As at least one region was iteratively partitioned at 406, analysis may be performed on at least one sub-region. Further, as analysis may be performed on all regions (and sub-regions), more than one selected region for which a temperature increase can be permitted will likely be identified. Identification of such selected regions leverages the temperature-voltage asymmetry described above with reference to FIG. 6.

Next, at 410 of method 400, a reduced heat dissipation factor may be optionally determined and compared with a worst-case heat dissipation factor. The reduced heat dissipation factor may be determined based on the selected regions identified at 406 and/or 408—specifically, the number of identified selected regions and the magnitude of their respective temperature increases that can be permitted. The worst-case heat dissipation factor may be a heat dissipation factor with which the cooling system would be implemented so that the acceptable failure rate of the IC would not be exceeded during worst-case operation—that is, for operating conditions in which the functional blocks or regions of the IC assume their respective maximum temperatures and maximum supply voltages. Comparison of the reduced heat dissipation factor to the worst-case heat dissipation factor may include computing the ratio of the former to the latter, thereby obtaining a quantification of the gains afforded by the reduced heat dissipation factor.

Turning to FIG. 4B, at 412 of method 400, the cooling system is implemented with the reduced heat dissipation factor by configuring the cooling system to allow the temperature increase in the selected region(s) identified at 406 and/or 408. As more than one region may have been identified, the cooling system may be configured to allow more than one temperature increase.

Implementing the cooling system with the reduced heat dissipation factor at 412 may include a variety of design-time and/or run-time actions, some of which may depend on whether or not the cooling system includes an active cooling system. For example, implementing the cooling system may include, at 414, reducing a size of the active cooling mechanism. A fan size may be reduced, for example. Implementing the cooling system may include, at 416, reducing an operating frequency of the active cooling mechanism. The operating frequency may be reduced by reducing the frequency at which power is supplied to the active cooling mechanism, for example. Implementing the cooling system may include, at 418, reducing a size of a passive cooling mechanism. Here, one or more dimensions of a heat sink (e.g., heat sink 202 of FIG. 1) may be reduced, for example. Implementing the cooling system may further include, at 420, reducing a surface area of the passive cooling mechanism. This may include reducing the number of fins (e.g., fin 203 of FIG. 2) included in the passive cooling mechanism. Implementing the cooling system may include, at 422, selecting a thermal interface material based on the reduced heat dissipation factor. The thermal interface material may be configured to thermally bond a top surface of SOC 100 to a bottom surface of heat sink 202, for example. Selection of the thermal interface material based on the reduced heat dissipation factor may allow selection of a less costly or more appropriate thermal interface material. Finally, implementing the cooling system may include, at 424, positioning the cooling system or portions thereof at a location based on a region having a greatest failure rate out of the failure rates of the plurality of regions. Here, the region having the greatest failure rate may be specifically targeted to achieve desired reliability during IC operation.

Turning to FIG. 4C, at 426 of method 400, an operational parameter of the cooling system and/or a region of the IC may be dynamically adjusted in response to a reliability condition (e.g., failure risk exceeding a threshold). Dynamic adjustment of the operational parameter may include, at 428, dynamically increasing the reduced heat dissipation factor (e.g., with increased fan activity) if an activity of a region having a projected supply voltage equal to a maximum supply voltage exceeds an activity threshold. Here, cooling is targeted for this region as it has been identified as being associated with a greatest reliability risk of the plurality of regions on the IC—that is, taking into account the failure risk based on the asymmetric contribution of its maximum supply voltage to its failure rate. The reliability risk may be computed in various suitable manners, and in some examples may be based on one or more of a failure rate, activity level, an activity level history, etc. Moreover, the activity of the region may be defined in various suitable manners; in some examples, activity may be a measure of instructions per cycle executed by the region (or an associated functional block).

Dynamic adjustment of the operational parameter may include, at 430, reducing the voltage supplied to the CPU functional block (e.g., CPU functional block 104 of FIG. 1) if the reliability risk of the CPU functional block exceeds a threshold. Here, performance in the CPU functional block may be sacrificed to maintain the reliability risk at an acceptable level. Dynamic adjustment of the operational parameter may include, at 432, increasing a fan speed of an active cooling mechanism (e.g., fan 204) in response to detecting that a reliability risk of a region has exceeded a threshold. Here, heat dissipation may be increased to maintain the reliability risk at an acceptable level. Dynamic adjustment of the operational parameter may further include, at 434, increasing an operating frequency of the active cooling mechanism in response to detecting that the reliability risk of a region exceeds a threshold. In some scenarios, operating the active cooling mechanism may include alternately powering the active cooling mechanism on and off at a frequency. This frequency may be dynamically increased in response to detecting that the reliability risk of a region exceeds a threshold.

Dynamic adjustment of the operational parameter may include, at 436, reducing the clock frequency of the CPU functional block so that acoustic output generated by the active cooling mechanism does not exceed a threshold. Here, CPU functional block activity is reduced via the clock frequency reduction, allowing the cooling mechanism to dissipate less heat and accordingly reduce its acoustic output, which may be especially important for contexts in which voice input is received. Dynamic adjustment of the operational parameter may include, at 438, scheduling a replacement or accelerating a replacement schedule for the IC in response to detecting that a reliability risk of a region has exceeded a threshold. Here, an increased reliability risk is permitted, as a reduction in performance cannot be tolerated. Scheduling the replacement may include generating output indicating the scheduled replacement. Dynamic adjustment of the operational parameter may include, at 440, generating output indicating that a reliability risk of a region has exceeded a threshold in response to detecting that the reliability risk has exceeded the threshold. In some examples, the output may be conveyed to a user via a suitable output device.

Dynamic adjustment of the operational parameter may further include, at 442, dynamically adjusting an operational parameter of the cooling device and/or a region (or functional block) based on user input received via a suitable input device. Any of the operational parameters that may be dynamically adjusted may be controlled based on user input, including but not limited to active cooling mechanism speed, operating frequency, functional block clock frequency, replacement scheduling, etc. Dynamic adjustment of the operational parameter may include, at 444, copying data stored in a storage system communicatively coupled to the IC to a redundant storage system in response to detecting that a reliability risk of a region has exceeded a threshold. Here, data that may be adversely affected in the event of a departure from intended IC operation may be copied to the redundant storage system to ensure continued integrity of, and access to, the data. Dynamic adjustment of the operational parameter may include, at 446, increasing a frequency at which one or more functional blocks of the IC are checkpointed in response to detecting a reliability risk of a region exceeding a threshold. In some examples, the checkpointing frequency may be increased for a functional block if the reliability risk of that functional block exceeds a threshold. Here, increased checkpointing frequency may enable the state of one or more functional blocks to be rolled back to in the event of a departure from intended functional block operation, for implementations in which the IC includes checkpointing components. Finally, dynamic adjustment of the operational parameter may include, at 448, permitting a higher reliability risk in a region but deactivating other regions of the IC. Deactivation of other regions may include reducing the voltages supplied to these regions, for example. Here, maintenance of an overall failure rate of the IC may be attempted by permitting higher reliability risk in one region but reducing the reliability risks in other regions.

Thus, as shown and described, method 400 may be employed to obtain savings when implementing a cooling system configured to dissipate heat generated by an IC, during the design and/or operation of the cooling system. The savings may include reductions in power consumption due to reduced fan speed, fan size, and/or operating frequency. Alternatively or additionally, the savings may manifest as reductions in material cost due to reductions in heat sink size, heat sink surface area, and/or less expensive or more targeted selection of thermal interface material. This allows a cooling system to be tailored to a majority of use cases employed by typical users (e.g., up to 80% of maximum possible IC activity), while retaining the ability to dynamically adapt the cooling system and/or IC for high performance corner cases in which IC activity is maximized (e.g., above 80% activity). As such, a cooling system need not be "over-designed" for worst-case operating conditions. The approaches described herein may be especially applicable to leading edge silicon processors and SOC designs, such as <45 nm silicon implementations and advanced material/device systems employing high-K/metal gates, III-V semiconductors, FinFETs, TFETs, etc. Moreover, thin form factor computing devices may particularly benefit from the approaches described herein, as the size of their housings may be reduced as a consequence of a reduction in the size of their cooling devices. Method 400 achieves these benefits by recognizing the asymmetrical contribution of voltage and temperature to failure rate, and by obtaining more granular knowledge of the operating conditions of an IC. While shown and described with reference to an SOC, it will be appreciated that the approaches described herein may apply to devices other than an SOC, including those that implement functional blocks on two or more separate packages.

FIG. 7 schematically shows a non-limiting example of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic subsystem 702 and a storage subsystem 704. Computing system 700 may optionally include an input/output subsystem 706, and/or other components not shown in FIG. 7.

Logic subsystem 702 includes one or more physical devices configured to execute instructions. For example, the logic subsystem 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 702 may include one or more processors configured to execute software instructions. One example of executable instructions are instructions that carry out the above-described dynamic management policies. Additionally or alternatively, the logic subsystem may include one or more hardware or firmware logic machines configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 704 includes one or more physical devices configured to hold instructions executable by the logic machine to implement the methods and processes described herein. When such methods and processes are implemented, the state of storage subsystem 704 may be transformed—e.g., to hold different data.

Storage subsystem 704 may include removable and/or built-in devices. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic subsystem 702 executing instructions held by storage subsystem 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, input/output subsystem 706 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of implementing a cooling system configured to cool an integrated circuit, the method comprising:
    determining, at a processor of a computing device, for each of a plurality of regions of the integrated circuit, a failure rate for that region based on a projected temperature and a projected supply voltage of that region;
    determining, at the processor, a heat dissipation factor of the cooling system based on the failure rates of the regions, where implementation of the heat dissipation factor would, for each region, reduce its projected temperature to a reduced temperature, so that an overall failure rate of the integrated circuit is not exceeded during operation of the integrated circuit;
    analyzing, at the processor, the reduced temperatures and projected supply voltages of the regions to identify a selected region having a projected supply voltage less than a maximum supply voltage of the regions and for which a temperature increase from the reduced temperature can be permitted without exceeding the overall failure rate; and
    implementing the cooling system with a reduced heat dissipation factor reduced relative to the heat dissipation factor determined based on the failure rates of the regions by configuring the cooling system to allow the temperature increase from the reduced temperature in the selected region without exceeding the overall failure rate.

2. The method of claim 1, further comprising, if an activity of a region having a projected supply voltage equal to the maximum supply voltage exceeds an activity threshold, dynamically increasing the reduced heat dissipation factor.

3. The method of claim 1, where implementing the cooling system with the reduced heat dissipation factor includes dynamically adjusting operation of an active cooling mechanism of the cooling system.

4. The method of claim 1, where implementing the cooling system with the reduced heat dissipation factor includes reducing a size of an active cooling mechanism of the cooling system.

5. The method of claim 1, where implementing the cooling system with the reduced heat dissipation factor includes reducing an operating frequency of an active cooling mechanism of the cooling system.

6. The method of claim 1, where implementing the cooling system with the reduced heat dissipation factor includes reducing a size of a passive cooling mechanism of the cooling system.

7. The method of claim 1, where implementing the cooling system with the reduced heat dissipation factor includes reducing a surface area of a passive cooling mechanism of the cooling system.

8. The method of claim 1, where implementing the cooling system with the reduced heat dissipation factor includes selecting a thermal interface material configured to thermally bond the integrated circuit to the cooling device based on the reduced heat dissipation factor.

9. The method of claim 1, where implementing the cooling system with the reduced heat dissipation factor includes positioning the cooling system proximate the integrated circuit at a location based on a region having a greatest failure rate of the plurality of regions.

10. A method of implementing a cooling system configured to cool an integrated circuit, the method comprising:
    determining, at a processor of a computing device, for each of a plurality of regions of the integrated circuit, a failure rate based on a projected temperature and projected supply voltage of that region;
    determining, at the processor, a heat dissipation factor of the cooling system based on the failure rates of the regions, where implementation of the heat dissipation factor would, for each region, reduce its projected temperature to a reduced temperature, so that an overall failure rate of the integrated circuit is not exceeded during operation of the integrated circuit;
    for at least one of the regions of the integrated circuit, iteratively partitioning, at the processor, the region into smaller and smaller sub-regions and, at each iteration, identifying, at the processor, a selected sub-region for which a temperature increase from the reduced temperature can be permitted without exceeding the overall failure rate; and
    implementing the cooling system with a reduced heat dissipation factor reduced relative to the heat dissipation factor determined based on the failure rates of the regions by configuring the cooling system to allow the temperature increases from the reduced temperatures in each selected sub-region without exceeding the overall failure rate.

11. A method of implementing a cooling system configured to cool an integrated circuit, comprising:
    determining, at a processor of a computing device, for each of a plurality of regions of the integrated circuit, a failure rate for that region based on a projected temperature and a projected supply voltage of that region;
    determining, at the processor, a heat dissipation factor of the cooling system based on the failure rates of the regions, where implementation of the heat dissipation factor would, for each region, reduce its projected temperature to a reduced temperature, so that an overall failure rate of the integrated circuit is not exceeded during operation of the integrated circuit;
    analyzing, at the processor, the reduced temperatures and projected supply voltages of the regions to identify a selected region having a projected supply voltage less than a maximum supply voltage of the regions and for which a temperature increase from the reduced temperature can be permitted without exceeding the overall failure rate;
    implementing the cooling system with a reduced heat dissipation factor reduced relative to the heat dissipation factor determined based on the failure rates of the regions by configuring the cooling system to allow the temperature increase from the reduced temperature in the selected region without exceeding the overall failure rate; and
    dynamically adjusting an operational parameter of the cooling system and/or one of the regions in response to a reliability condition at one of the regions.

12. The method of claim 11, wherein dynamically adjusting the operational parameter includes reducing a supply voltage supplied to a central processing unit of the integrated circuit in response to detecting reliability risk exceeding a threshold.

13. The method of claim 11, wherein dynamically adjusting the operational parameter includes increasing a fan speed of an active cooling mechanism of the cooling system in response to detecting reliability risk exceeding a threshold.

14. The method of claim 11, wherein dynamically adjusting the operational parameter includes increasing an operating frequency of an active cooling mechanism of the cooling system in response to detecting reliability risk exceeding a threshold.

15. The method of claim 11, wherein dynamically adjusting the operational parameter includes reducing a clock frequency of a central processing unit of the integrated circuit so that acoustic output generated by an active cooling mechanism of the cooling system does not exceed an acoustic threshold.

16. The method of claim 11, wherein dynamically adjusting the operational parameter includes scheduling a replacement of the integrated circuit in response to detecting reliability risk exceeding a threshold.

17. The method of claim 11, wherein dynamically adjusting the operational parameter includes generating output in response to detecting reliability risk exceeding a threshold, the output indicating the reliability risk exceeding the threshold.

18. The method of claim 11, wherein the operational parameter is dynamically adjusted based on user input.

19. The method of claim 11, wherein dynamically adjusting the operational parameter includes copying data stored in a storage system communicatively coupled to the integrated circuit to a redundant storage system in response to detecting reliability risk exceeding a threshold.

20. The method of claim 11, wherein dynamically adjusting the operational parameter includes increasing a frequency at which one or more functional blocks of the integrated circuit are checkpointed in response to the failure rate of the region exceeding the overall failure rate.

* * * * *